United States Patent [19]

Nishijima et al.

[11] Patent Number: 4,482,926
[45] Date of Patent: Nov. 13, 1984

[54] METHOD AND APPARATUS FOR MAGNETIC RECORDING AND REPRODUCING

[75] Inventors: Hideo Nishijima; Isao Fukushima, both of Katsuta; Masao Hibi, Kodaira, all of Japan

[73] Assignee: Hitachi, Ltd., Tokyo, Japan

[21] Appl. No.: 318,256

[22] Filed: Nov. 4, 1981

[30] Foreign Application Priority Data

Nov. 7, 1980 [JP] Japan ............... 55-155920

[51] Int. Cl.$^3$ ............... H04N 5/78; G11B 27/08
[52] U.S. Cl. ............... 360/14.2; 360/73
[58] Field of Search ............... 360/14.1, 14.2, 14.3, 360/55, 70, 71, 73

[56] References Cited

U.S. PATENT DOCUMENTS 3,939,491 2/1976 Shigeta ............... 360/14.1
4,358,797 11/1982 Nishijima et al. ............... 360/14.2

FOREIGN PATENT DOCUMENTS 3006735 11/1980 Fed. Rep. of Germany ..... 360/14.2

Primary Examiner—Aristotelis M. Psitos
Attorney, Agent, or Firm—Kenyon & Kenyon

[57] ABSTRACT

A method for magnetic recording and reproducing suitable for the discontinuous recording, in which the magnetic tape is rewound during a predetermined length of time, the number of the synchronization pulses recorded on the magnetic tape is counted and stored during the rewinding of the magnetic tape, and the magnetic recording is re-started when the number of the synchronization pulses, counted during the winding of the magnetic tape after the pause period, reaches the value equal to the stored number of the synchronization pulses, whereby a satisfactory continuity is established between the pictures recorded before and after a pause period.

4 Claims, 3 Drawing Figures

4,482,926

METHOD AND APPARATUS FOR MAGNETIC RECORDING AND REPRODUCING

TECHNICAL FIELD

The present invention relates to a method and an apparatus for magnetic recording and reproducing, and more particularly to a method and an apparatus for carrying out the editorial arrangement of the recorded pictures in a method and an apparatus for magnetic recording and reproducing.

BACKGROUND ART

In discontinuous recording in the operation of a video magnetic recording and reproducing apparatus, interruption of the recording takes place during the pause period, and after such pause period the re-start of the recording takes place. With regard to the video signals recorded on a magnetic tape used for video magnetic recording and reproducing, the continuity of the video picture between the picture recorded before such pause and the picture recorded after such re-start should be maintained, because some disturbances of the picture tend to occur at the transition portion of the recorded picture.

In prior art systems for carrying out discontinuous recording, for example, a method is used in which the magnetic tape is rewound to a predetermined length of the magnetic tape during the pause period by rotating the supply reel backwardly, and after the re-start of the recording the phase coinciding process is carried out between the recorded synchronization signals picked up by a control head and the synchronization signals which are being recorded, and after the phase coincidence has been established the recording is re-started.

However, in this method there is a problem that a portion of the new video signals tends to be recorded overlapping the formerly recorded video signals due to the difference between the length of the magnetic tape which is rewound and the length of the magnetic tape which is necessary for the phase coinciding process. In consequence, there is a problem that the quality of the reproduced picture tends to be deteriorated. Such prior art system is disclosed in Japanese Patent Application Laid-open No. 55-114084, corresponding to U.S. patent application No. 123644 and now U.S. Pat. No. 4,358,797.

DISCLOSURE OF THE INVENTION

It is the object of the present invention to provide an improved method and apparatus to carry out satisfactorily discontinuous recording.

In accordance with an aspect of the present invention, there is provided a method for magnetic recording and reproducing in which the re-start of magnetic recording after a pause period is carried out, said method comprising the steps of: rewinding the magnetic tape during a predetermined length of time when the magnetic recording is interrupted, counting and storing the number of synchronization pulses recorded on the magnetic tape corresponding to the length of said rewound magnetic tape during said predetermined length of time, winding the magnetic tape when the magnetic recording is re-started after said pause period, counting the number of synchronization pulses in the winding of the magnetic tape and comparing said counted number of the synchronization pulses with said stoved number of the synchronization pulses, and determining the timing of the re-start of the magnetic recording in accordance with the result of said comparison.

In accordance with another aspect of the present invention, there is provided an apparatus for magnetic recording and reproducing in which the re-start of the magnetic recording after a pause period is carried out, said apparatus comprising: a control head for both writing-in synchronization signals to a magnetic tape and reading-out the synchronization signals from the magnetic tape, a switch for switching the circuit of said control head between the writing-in manner and the reading-out manner, a monostable multivibrator circuit for producing a signal having a predetermined length of duration to define the length of time of the rewinding of the magnetic tape after the interruption of the magnetic recording, and a counter circuit responsive to the signal produced by said monostable multivibrator circuit for counting and storing the number of the synchronization pulses recorded on the magnetic tape corresponding to the length of the rewound magnetic tape and for providing the output signal used for producing a signal for controlling said switch and a picture recording circuit, whereby the determination of the timing of the re-start of the magnetic recording is carried out in accordance with the output signal of said counter circuit.

DESCRIPTION OF THE PREFERRED EMBODIMENTS

Figure 1:
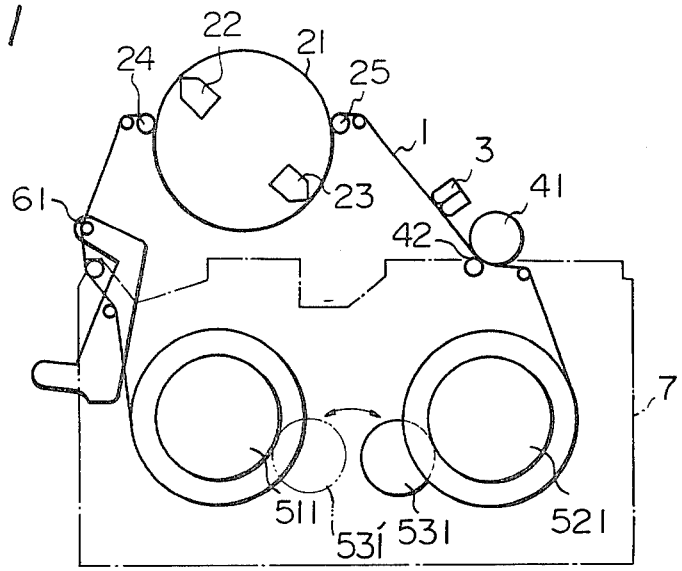
FIG. 1 illustrates schematically the structure of a magnetic recording and reproducing apparatus used for carrying out the method according to an embodiment of the present invention.
Figure 2:
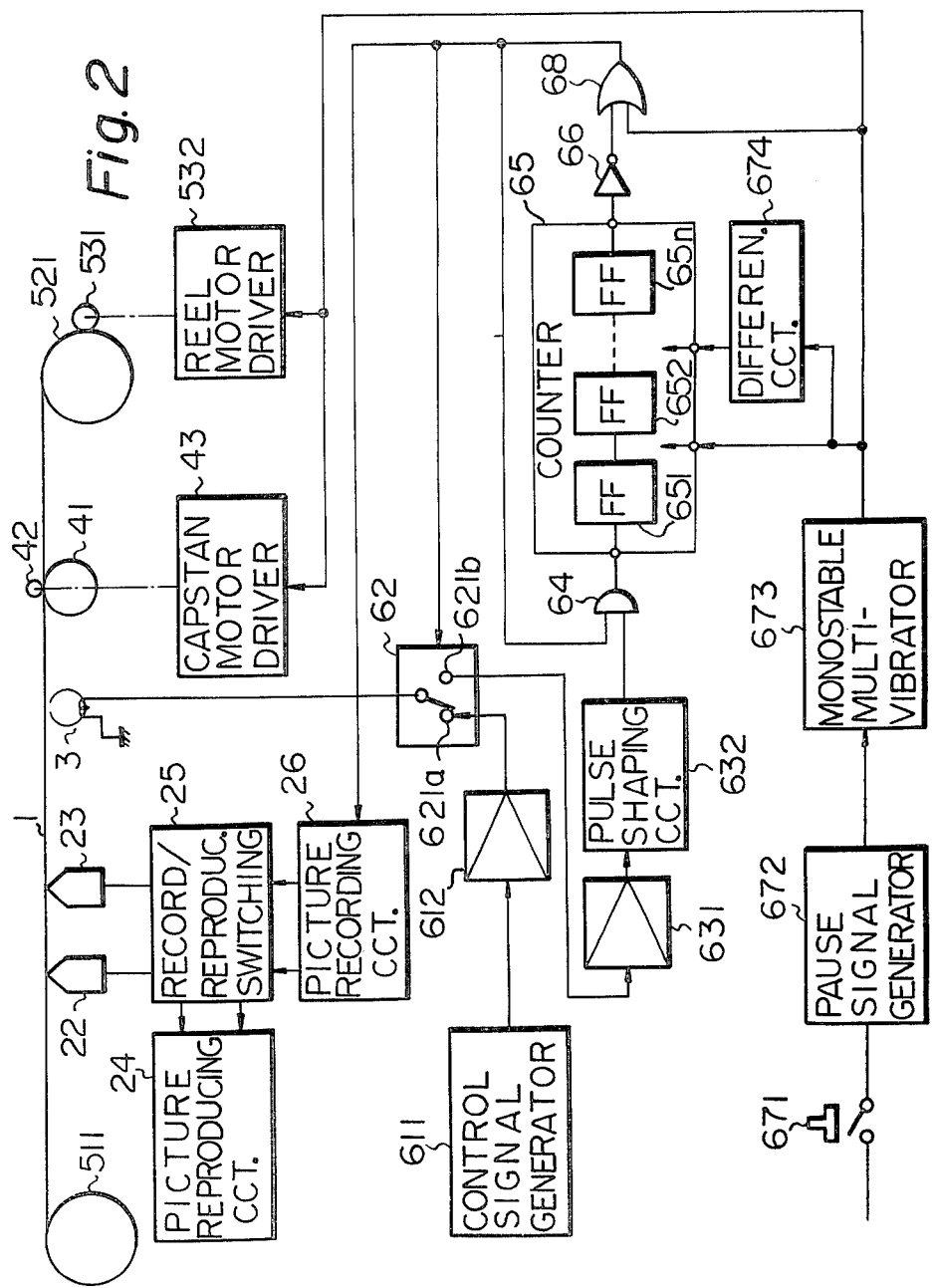
FIG. 2 illustrates the schematic diagram of the circuit for controlling the magnetic recording and reproducing apparatus according to an embodiment of the present invention.

A magnetic recording and reproducing apparatus used for carrying out the method of magnetic recording and reproducing in accordance with an embodiment of the present invention is illustrated in FIGS. 1 and 2. The schematic structure of the magnetic recording and reproducing apparatus is illustrated in FIG. 1, while the schematic block diagram of the circuit for controlling the magnetic recording and reproducing apparatus is illustrated in FIG. 2.

The magnetic recording and reproducing apparatus comprises a magnetic tape 1, a rotational cylinder 21 having video heads 22 and 23 for carrying out the recording and reproducing of a picture, loading pins 24 and 25, a tension pin 61, a control head 3 for carrying out the recording and the reproducing of a synchronization signal, a pressure roller 41, a rotational capstan 42, a casette 7, a tape supply reel 511, a tape take-up reel 521, and an idler 531 which is driven by a motor (not shown in FIG. 1) for driving the tape take-up reel 521.

The circuit for controlling the magnetic recording and reproducing apparatus comprises a recording/reproducing switching circuit 25 connected to the video heads 22 and 23, a picture recording circuit 26 and a picture reproducing circuit 24 connected to the recording/reproducing switching circuit 25, a capstan motor driver circuit 43, a reel motor driver circuit 532, a control signal generator 611, an amplifier 612, a switch 62 for switching the circuit of the control head 3 between the writing-in manner and the reading-out manner, an amplifier 631 for detecting the synchronization signal in the reading-out manner, a pulse shaping circuit 632 for producing the synchronization signal in the form of pulses, an AND gate 64, a counter circuit 65 consisting of a series of flip-flop circuits 651, 652, ..., 65n, a pause button 671, a pause signal generator 672, a monostable multivibrator 673, a differentiation circuit 674, an inverter 66, and an OR gate 68.

Figure 3:
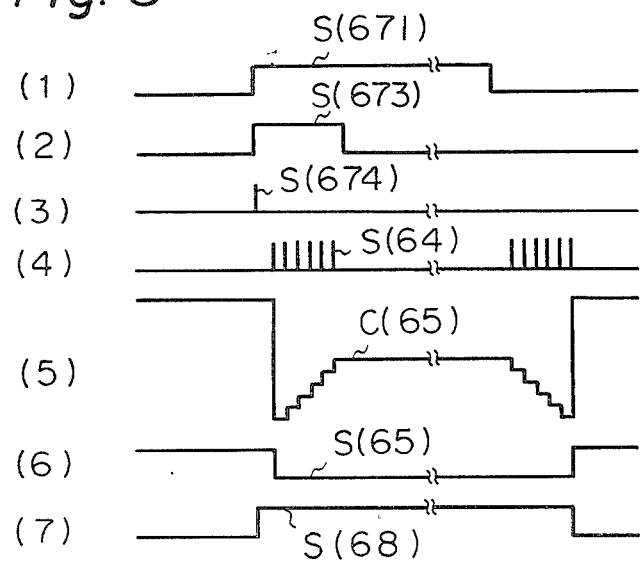
FIG. 3 illustrates the waveforms of the signals obtained in the portions of the circuit of FIG. 2.

The operation of the circuit of FIG. 2 will be described with reference to FIG. 3 which illustrates the waveforms of the signals obtained in portions of the circuit. While the recording is being carried out, the video heads 22 and 23 receive the recording signal from the picture recording signal 26 via the recording/reproducing switching circuit 25, and the control head 3 receives the control signal from the control signal generator 611 via the amplifier 612 and the contact 621a of the switch 62. In order to halt the recording, the operator pushes the pause button 671.

When the pause button 671 is pushed, a pause signal S(671) is applied to the monostable multivibrator 673, which produces a pulse signal S(673) having a predetermined pulse-width beginning at the rising edge of the signal S(671). The signal S(673) is applied to the capstan motor driver circuit 43 and the reel motor driver circuit 532, so that the direction of the feeding of the magnetic tape 1 is reversed and the magnetic tape 1 is rewound for the duration of the pulse signal S(673).

Such rewinding of the magnetic tape can be carried out by using a known mechanism provided in conventional video tape recorders and audio tape recorders. For example, upon application of the signal S(673) to the reel motor driver circuit 532, the reel motor changes its rotational direction and rotates in the reverse rotational direction during the application of the signal S(673), and the idler 531 changes its position from 531 to 531' in FIG. 1 to come into contact with the tape supply reel 511 to drive the tape supply reel 511 to rewind the magnetic tape 1.

Also, the signal S(673) is applied to one input terminal of the OR gate 68 to turn the output signal S(68) to HIGH. This HIGH S(68) signal is applied to the picture recording circuit 26 to stop the recording, and is also applied to the switch 62 to change over the connection to the side 621b, and also applied to one input terminal of the AND gate 64.

During this rewinding of the magnetic tape 1, the synchronization signals recorded on the magnetic tape are picked up by the control head 3 and are supplied to the pulse shaping circuit 632 through the amplifier 631 to produce the signals S(64) in the form of pulse. These signals S(64) are supplied to the counter circuit 65 through the AND gate 64. A preset signal S(674) produced in the differentiation circuit 674 which receives the signal S(673) is supplied to the counter circuit 65. Upon reception of the preset signal S(674), the entire n stage flip-flop circuits 651, 652, ..., 65n turn to, for example, the HIGH state. The signal S(673) is also supplied to the counter circuit 65 as the switching signal to carry out switching between the up-counting and the down-counting, so that the counter circuit 65 is operated as an up-counter during the rewinding of the magnetic tape. Except for the period of this rewinding of the magnetic tape, the counter circuit 65 is operated as a down-counter. The signal C(65) which represents the number counted is thus stored in the counter circuit 65.

When the recording is re-started after the above described tape rewinding period, the counter circuit 65 is operated as a down counter so as to count again the synchronization signals which have been counted during the rewinding of the magnetic tape. When the result of this down-counting reaches the value equal to the value at the beginning of the above described up-counting, the output signal S(65) of the counter circuit turns to HIGH potential which is supplied to one input of the OR gate 68 through the inverter 66, so that the output signal S(68) of the OR gate 68 turns to LOW. This LOW S(68) signal is supplied to the picture recording circuit 26 to re-start the recording. This LOW S(68) signal is also supplied to the switch 62 and to one input terminal of the AND gate 64 to change over the switch 62 to the side of 621a causing the control signal to be supplied to the control head 3 and to prevent the counter circuit 65 from receiving input signals. The number n of stages of the flip-flop circuits 651, 652, ..., 65n is selected much larger than the number of the synchronization signals to be counted. The counter circuit 65 can be constructed easily using the usual devices of digital integral circuit type. For example, integrated circuits such as HD14510B and HD14516B manufactured by Hitachi Ltd. may be used.

If an overlapped recording is required in view of the delay in the timing of the stopping and the re-starting of the recording and the delay caused by the characteristic of the circuits, it is advisable to design the system that the re-starting of the recording takes place at the timing earlier by a predetermined time length than the timing corresponding to the preset value.

We claim:

1. An apparatus for magnetic recording and reproducing in which the re-start of the magnetic recording after a pause period is carried out, said apparatus comprising:

a control head for both writing-in synchronization signals to a magnetic tape and reading-out the synchronization signals from the magnetic tape, a switch for switching the circuit of said control head between the writing-in manner and the reading-out manner, a monostable multivibrator circuit for producing a signal having a predetermined length of duration to define the length of time of the rewinding of the magnetic tape after the interruption of the magnetic recording, a counter circuit responsive to the signal produced by said monostable multivibrator circuit for counting and storing the number of the synchronization pulses recorded on the magnetic tape corresponding to the length of the rewound magnetic tape and for providing the output signal used for producing a signal for controlling said switch and a picture recording circuit, an inverter, an OR gate wherein the output signal of said counter circuit and the output signal of said multivibrator circuit combined through said inverter and said OR gate to provide said control signal for controlling said switch and said picture recording circuit, and whereby the determination of the timing of the re-start of the magnetic recording is carried out in accordance with the output signal of said counter circuit.

2. An apparatus as defined in claim 1, wherein the output of said monostable multivibrator circuit is supplied to control terminal of a reel motor and a control terminal of a capstan motor driver circuit.

3. An apparatus for magnetic recording and reproducing in which the re-start of the magnetic recording after a pause period is carried out, said apparatus comprising:

a control head for both writing-in sychronization signals to a magnetic tape and reading-out the synchronization signals from the magnetic tape, a switch for switching the circuit of said control head between the writing-in manner and the reading-out manner, a monostable multivibrator circuit for producing a signal having a predetermined length of duration to define the length of time of the rewinding of the magnetic tape after the interruption of the magnetic recording, a counter circuit responsive to the signal produced by said monostable multivibrator circuit for counting and storing the number of the synchronization pulses recorded on the magnetic tape corresponding to the length of the rewound magnetic tape and for providing the output signal used for producing a signal for controlling said switch and a picture recording circuit, an inverter, an OR gate, and an AND gate, the output signal of said counter circuit supplied through said inverter and said OR gate to one of said AND gate connected to the input terminal of said counter circuit.

4. An apparatus as defined in claim 3, wherein the output of said monostable multivibrator circuit supplied to said control terminal of said reel motor and said control terminal of said capstan motor driver circuit.

* * * * *